(12) United States Patent
Harman

(10) Patent No.: US 7,673,834 B2
(45) Date of Patent: Mar. 9, 2010

(54) VORTEX RING GENERATOR

(75) Inventor: Jayden David Harman, San Rafael, CA (US)

(73) Assignee: Pax Streamline, Inc., San Rafael, CA (US)

( * ) Notice: Subject to any disclaimer, the term of this patent is extended or adjusted under 35 U.S.C. 154(b) by 0 days.

(21) Appl. No.: 10/884,032

(22) Filed: Jul. 2, 2004

(65) Prior Publication Data

US 2005/0269458 A1    Dec. 8, 2005

Related U.S. Application Data

(63) Continuation of application No. PCT/AU03/00003, filed on Jan. 3, 2003.

(30) Foreign Application Priority Data

| Jan. 3, 2002 | (AU) | ............................ PR9827 |
| Mar. 26, 2002 | (AU) | ............................ PS1352 |

(51) Int. Cl.
*B64C 21/00* (2006.01)
(52) U.S. Cl. .................. 244/199.1; 244/200.1
(58) Field of Classification Search ............... 244/199, 244/198, 203, 204, 206, 200, 130, 53 B; 102/501; 239/461, 463
See application file for complete search history.

(56) References Cited

U.S. PATENT DOCUMENTS

| 700,785 A | 5/1902 | Kull |
| 794,926 A | 7/1905 | Crawford |
| 871,825 A * | 11/1907 | Schupmann ............... 102/501 |
| 879,583 A | 2/1908 | Pratt |
| 943,233 A | 12/1909 | Boyle |
| 965,135 A | 7/1910 | Gibson |
| 969,101 A | 8/1910 | Gibson |
| 1,023,225 A | 4/1912 | Shlosberg |
| 1,272,180 A | 7/1918 | Andresen |
| 1,353,478 A | 9/1920 | Jeffries, Sr. |
| 1,356,676 A | 10/1920 | Weller et al. |
| 1,396,583 A | 11/1921 | Krafve |
| 1,471,697 A | 10/1923 | Kubes |
| 1,505,893 A | 8/1924 | Hunter et al. |
| 1,658,126 A | 2/1928 | Jehle |
| 1,667,186 A | 4/1928 | Bluehdorn |
| 1,709,217 A | 4/1929 | Hamilton |
| 1,713,047 A | 5/1929 | Maxim |

(Continued)

FOREIGN PATENT DOCUMENTS

DE    003315258    10/1984

(Continued)

OTHER PUBLICATIONS http://www.tailinghtking.com/images/hood-fenderornaments/hood_ornament_pics/....*

(Continued)

*Primary Examiner*—Tien Dinh
(74) *Attorney, Agent, or Firm*—Carr & Ferrell LLP

(57) ABSTRACT

A vortex ring generator adapted to be associated with a body subjected to fluid flow, the vortex ring generator being adapted to produce a fluid flow in the form of a vortex ring with the fluid flow moving over the body from the vortex ring generator.

14 Claims, 7 Drawing Sheets

U.S. PATENT DOCUMENTS

| | | |
|---|---|---|
| 1,729,018 A | 9/1929 | Siders |
| 1,756,916 A | 4/1930 | Stranahan |
| 1,785,460 A | 12/1930 | Schlotter |
| 1,799,039 A | 3/1931 | Conejos |
| 1,812,413 A | 6/1931 | Reynolds |
| 1,816,245 A | 7/1931 | Wolford |
| 1,872,075 A | 8/1932 | Dolza |
| 1,891,170 A | 12/1932 | Nose |
| 1,919,250 A | 7/1933 | Olson |
| 2,068,686 A | 1/1937 | Lascroux |
| 2,139,736 A | 12/1938 | Durham |
| 2,165,808 A | 7/1939 | Murphy |
| 2,210,031 A | 8/1940 | Greene |
| 2,359,365 A | 10/1944 | Katcher |
| 2,879,861 A | 3/1959 | Belsky et al. |
| 2,908,344 A | 10/1959 | Maruo |
| 2,912,063 A | 11/1959 | Barnes |
| 2,958,390 A | 11/1960 | Montague |
| 3,066,755 A | 12/1962 | Diehl |
| 3,071,159 A * | 1/1963 | Coraggioso ............... 138/38 |
| 3,076,480 A | 2/1963 | Vicard |
| 3,081,826 A | 3/1963 | Loiseau |
| 3,082,695 A | 3/1963 | Buschhorn |
| 3,215,165 A | 11/1965 | Broadway |
| 3,232,341 A | 2/1966 | Woodworth |
| 3,339,631 A * | 9/1967 | McGurty et al. ......... 165/109.1 |
| 3,371,472 A | 3/1968 | Krizman, Jr. |
| 3,584,701 A | 6/1971 | Freeman |
| 3,692,422 A | 9/1972 | Girardier |
| 3,918,829 A | 11/1975 | Korzec |
| 3,927,731 A | 12/1975 | Lancaster |
| 3,940,060 A | 2/1976 | Viets |
| 3,957,133 A | 5/1976 | Johnson |
| 3,964,841 A | 6/1976 | Strycek |
| 4,050,539 A | 9/1977 | Kashiwara et al. |
| 4,206,783 A | 6/1980 | Brombach |
| 4,211,183 A * | 7/1980 | Hoult .................... 119/227 |
| 4,225,102 A * | 9/1980 | Frosch et al. ............ 244/130 |
| 4,299,553 A | 11/1981 | Swaroop |
| 4,317,502 A | 3/1982 | Harris et al. |
| 4,323,209 A * | 4/1982 | Thompson .............. 244/199 |
| 4,331,213 A | 5/1982 | Taniguchi |
| 4,505,297 A | 3/1985 | Leech, III et al. |
| 4,533,015 A | 8/1985 | Kojima |
| 4,540,334 A | 9/1985 | Stahle |
| 4,579,195 A | 4/1986 | Nieri |
| 4,644,135 A | 2/1987 | Daily |
| 4,679,621 A | 7/1987 | Michele |
| 4,685,534 A | 8/1987 | Burstein et al. |
| 4,699,340 A * | 10/1987 | Rethorst .................. 244/199 |
| 4,823,865 A | 4/1989 | Hughes |
| 4,834,142 A | 5/1989 | Johannessen |
| 4,993,487 A | 2/1991 | Niggemann |
| 4,996,924 A * | 3/1991 | McClain ................. 102/501 |
| 5,010,910 A | 4/1991 | Hickey |
| 5,040,558 A | 8/1991 | Hickey et al. |
| 5,052,442 A | 10/1991 | Johannessen |
| 5,058,837 A | 10/1991 | Wheeler |
| 5,100,242 A | 3/1992 | Latto |
| 5,139,215 A | 8/1992 | Peckham |
| 5,181,537 A | 1/1993 | Powers |
| 5,207,397 A | 5/1993 | Ng et al. |
| 5,220,955 A | 6/1993 | Stokes |
| 5,249,993 A | 10/1993 | Martin |
| 5,312,224 A | 5/1994 | Batchelder et al. |
| 5,337,789 A | 8/1994 | Cook |
| 5,382,092 A | 1/1995 | Okamoto et al. |
| 5,661,638 A | 8/1997 | Mira |
| 5,741,118 A | 4/1998 | Shinbara et al. |
| 5,787,974 A | 8/1998 | Pennington |
| 5,844,178 A | 12/1998 | Lothringen |
| 5,891,148 A | 4/1999 | Deckner |
| 5,934,612 A * | 8/1999 | Gerhardt ..................... 244/58 |
| 5,934,877 A | 8/1999 | Harman |
| 5,943,877 A | 8/1999 | Chen |
| 5,954,124 A | 9/1999 | Moribe et al. |
| 6,050,772 A | 4/2000 | Hatakeyama et al. |
| 6,179,218 B1 | 1/2001 | Gates |
| 6,241,221 B1 | 6/2001 | Wegner et al. |
| 6,273,679 B1 | 8/2001 | Na |
| 6,374,858 B1 | 4/2002 | Hides et al. |
| 6,382,348 B1 | 5/2002 | Chen |
| 6,385,967 B1 | 5/2002 | Chen |
| 6,415,888 B2 | 7/2002 | An et al. |
| 6,484,795 B1 | 11/2002 | Kasprzyk |
| 6,604,906 B2 | 8/2003 | Ozeki et al. |
| 6,623,838 B1 | 9/2003 | Nomura et al. |
| 6,632,071 B2 | 10/2003 | Pauly |
| 6,669,142 B2 * | 12/2003 | Saiz .......................... 244/119 |
| 6,684,633 B2 | 2/2004 | Jett |
| D487,800 S | 3/2004 | Chen et al. |
| 6,702,552 B1 * | 3/2004 | Harman ................. 416/223 R |
| 6,817,419 B2 | 11/2004 | Reid |
| 6,892,988 B2 * | 5/2005 | Hugues ..................... 244/199 |
| 6,932,188 B2 | 8/2005 | Ni |
| D509,584 S | 9/2005 | Li et al. |
| 6,959,782 B2 | 11/2005 | Brower et al. |
| 7,117,973 B2 | 10/2006 | Graefenstein |
| D539,413 S | 3/2007 | Parker et al. |
| 2003/0012649 A1 | 1/2003 | Sakai et al. |
| 2003/0190230 A1 | 10/2003 | Ito |
| 2004/0037986 A1 | 2/2004 | Houston et al. |
| 2004/0238163 A1 | 12/2004 | Harman |
| 2004/0244853 A1 | 12/2004 | Harman |
| 2005/0011700 A1 | 1/2005 | Dadd |
| 2005/0269458 A1 | 12/2005 | Harman |

FOREIGN PATENT DOCUMENTS

| | | |
|---|---|---|
| EP | 14257 | 8/1980 |
| FR | 2534981 A | 4/1984 |
| FR | 2 666 031 | 2/1992 |
| GB | 873135 | 7/1961 |
| GB | 2 063 365 A | 6/1981 |
| JP | 98264 | 6/1932 |
| JP | 129699 | 8/1979 |
| JP | S54129699 | 10/1979 |
| JP | 05332121 | 12/1993 |
| JP | 00257610 | 9/2000 |
| JP | 2000257610 | 9/2000 |
| JP | D1243052 | 6/2005 |
| SU | 431850 | 6/1974 |
| SU | 738566 | 6/1980 |
| SU | 850104 | 7/1981 |
| SU | 858896 | 8/1981 |
| SU | 1030631 | 7/1983 |
| TW | 565374 | 3/2002 |
| TW | M287387 | 2/2006 |
| WO | WO 81/03201 | 11/1981 |
| WO | WO 87 07048 A | 11/1987 |
| WO | WO 89 08750 A | 9/1989 |
| WO | WO 01/14782 A1 | 3/2001 |
| WO | PCT/AU2004/001388 | 1/2003 |
| WO | WO 03 056228 A | 7/2003 |

OTHER PUBLICATIONS

Dismuke's Message Board. http://www.radiodismuke.com/forum/index.php?showtopic=1109&mode=threaded&pid=.*
Derwent Abstract Accession No. 87-318963/45, SU 1291726 A (Makeevka Eng Cons) Feb. 23, 1987.
Derwent Abstract Accession No. 99-249047/32, JP 11072104 A (Saito Jidosha Shatai Kogyo KK) Mar. 16, 1999.
Patent Abstracts of Japan, Publication No. 2000-168632, Jun. 20, 2000, "Low Air Resistance Vehicle Body Using Vortex Ring."

Derwent Abstract Accession No. 97-198067/18, JP 09053787 A (Kajima Corp) Feb. 25, 1997.
Derwent Abstract Accession No. 97/546288/50, JP 09264462 A (Sekisui Chem Ind Co Ltd) Oct. 7, 1997.
Derwent Abstract Accession No. 1999-380417/32, JP 11148591 A (TLV Co Ltd) Jun. 2, 1999.
Derwent Abstract Accession No. E6575C/21, SU 687306A (Leningrad Forestry Acad) Sep. 28, 1977.
Derwent Abstract Accession No. N8420 E/42, SU 887876 A (As Ukr Hydromechani) Dec. 7, 1981.
Derwent Abstract Accession No. 85-073498/12, SU 1110986 A (Korolev A S) Aug. 30, 1984.
Derwent Abstract Accession No. 89-075095/10, SU 1418540 A (As Ukr Hydrodynamic) Aug. 23, 1988.
Derwent Abstract Accession No. 91-005279, SU 1560887 A (Sredaztekhenergo En) Apr. 30, 1990.
Derwent Abstract Accession No. 93-375668/47, SU 1756724 A (Odess Poly) Aug. 30, 1992.
Derwent Abstract Accession No. L0015B/47, SE 7803739 A (Ingenjorsfirma Garl) Nov. 5, 1979.
Derwent Abstraction Accession No. 89-157673, SU 1437579A (Lengd Kalinin Poly) Nov. 15, 1988.
Dr. Knott, Ron, "The Golden Section Ratio: Phi," Available at http://www.mcs.surrey.ac.uk/Personal/R.Knott/Fibonacci/phi.html (last accessed Sep. 26, 2006).
Karassik et al "Pump Handbook" pub. 1976 by McGraw-Hill, Inc.
Batchelor, G. K., "An Introduction to Fluid Dynamics", Cambridge Mathematical Library, 2000.
K. Foster et al., "Fluidics Components and Circuits," Wiley-Interscience, London, 1971, pp. 219-221.
The CAD Guidebook, A Basic Manual for Understanding and Improving Computer-Aided Design, Stephen J. Schoonmaker, Marcel Dekker, Inc., New York, 2002.

* cited by examiner

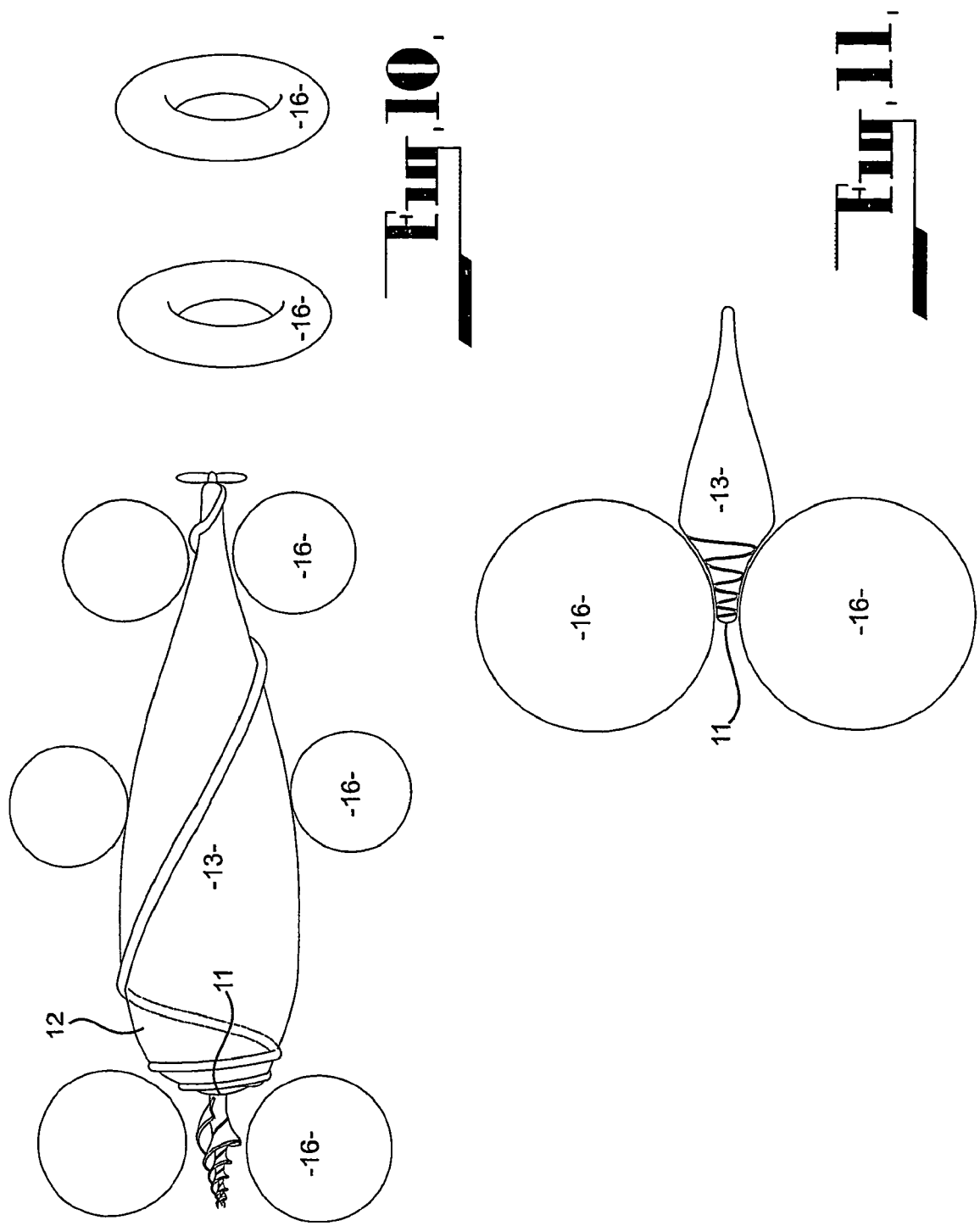

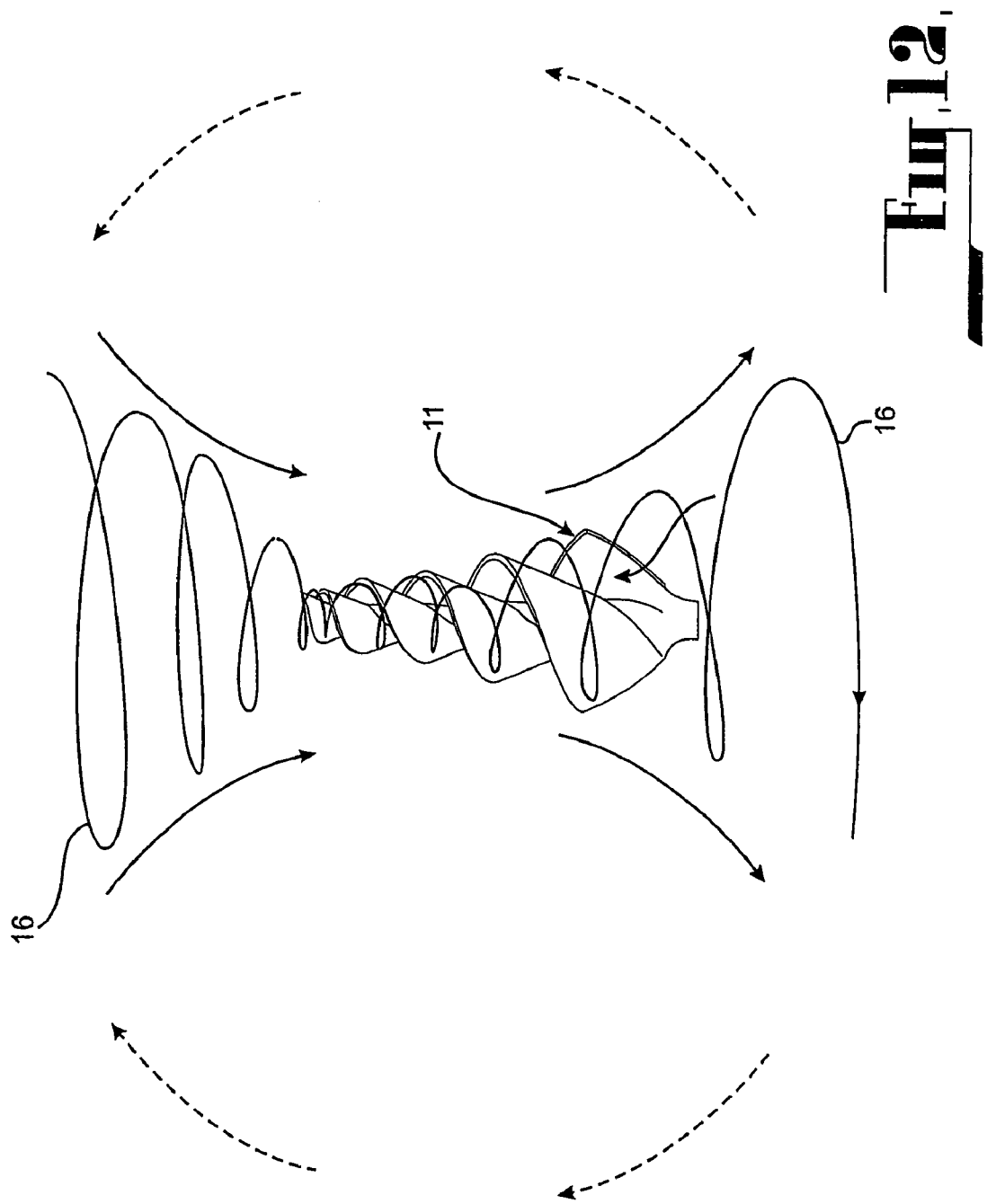

VORTEX RING GENERATOR

CROSS REFERENCES TO RELATED APPLICATIONS

This application is a continuation application and claims the priority benefit of Patent Cooperation Treaty Application Number PCT/AU03/00003 filed Jan. 3, 2003 which in turn claims the priority benefit of Australian Patent Application Number PR 9827 filed Jan. 3, 2002 and Australian Patent Application Number PS 1352 filed Mar. 26, 2002. The disclosure of these applications is incorporated herein by reference.

FIELD OF THE INVENTION

The present invention relates to the field of fluid mechanics and more particularly to the flow of a fluid relative to a body. More particularly, this invention seeks to reduce drag on a body or fuselage during relative movement of the body with respect to a fluid.

The invention is described herein by reference to its use in respect to any mobile body or fuselage, such as, including, but not limited to, projectiles, missiles, torpedoes, submarines and aircraft. However, the invention is not restricted to mobile fuselages, but may also be used to reduce drag on stationary bodies such as buildings, bridge pilings, and fixed obstacles in watercourses, airways or other fluid flow fields. Such applications are intended to be within the scope of the invention although not specifically described herein.

BACKGROUND ART

The greatest obstacle to obtaining optimum efficiency in streamlining a fuselage is surface friction. This can be in several forms but typically is one of or a combination of boundary layer drag, skin friction, viscosity, surface tension, cavitation and turbulence.

Existing technologies seek to reduce this drag and optimise the energy efficiency of a moving body or fuselage by altering its surface to be as smooth as possible with the least possible protuberances or alternatively to roughen the smooth surface or to give it a rippling surface similar to that of a shark, dolphin or golf ball.

The objective is to minimise the effects of drag from fluids flowing past.

Another attempt to cut drag has included the fitting of small vortex generators to wings and other parts of the fuselage.

A further attempt has been to fit a spike-like protuberance extending forwardly in the direction of travel of the fuselage through the fluid.

In general, it has been an objective of these attempts to maintain straight, laminar flow over the body of the fuselage, and to suppress separation or turbulence as far as is possible. Alternatively, through the use of dimpled or roughen surfaces and vortex generators, the objective has been to create myriad eddies in close proximity to the fuselage surface to break up the boundary layer.

Essentially, all these approaches are designed to assist fluids slide past the body with a minimum of friction.

SUMMARY OF THE INVENTION

It is an object of the invention to reduce the drag of a fluid moving relative to a body. It is a further object of this invention to enable the body to take advantage of the extraordinary efficiency of the vortex ring.

To this end, a body, for example a torpedo or rocket, is fitted with a vortex ring generator according to the invention, either at the nose of the body and/or around the body.

The objective is to produce a vortex ring at the nose of the body that conveys the fluid flow past the body while simultaneously creating a low-pressure region immediately in front of the nose. This low-pressure region is in fact, the core of the ring vortex.

A generated vortex ring moves relative to the fluid of which it is comprised and it cross-sectionally rolls, much like a wheel, rather than slides. Famed hydrodynamisist, Reynolds once stated, in reference to ring vortices, that "Nature prefers to roll rather than glide".

It is this feature that greatly contributes to ring vortex efficiency.

Presently used vortex generators are comprised of small tabs of straight or curved material, such as those situated above the leading edges of wings on aircraft. These generate turbulence fields of eddies that flow across the surface of the wing.

This invention is specifically designed to generate vortex rings which surround the body to enable the fluid flowing past the body to do so within the generated vortex ring. Preferably, such generators are specifically designed in accordance with the Golden Section or Phi geometry. Phi geometry has been found to represent the path of least resistance, friction or drag in Nature and is also the shape of naturally occurring vortices.

Accordingly, the invention resides in a vortex ring generator adapted to be associated with a body subjected to fluid flow over the body, the vortex ring generator adapted to produce a fluid flow in the form of a vortex ring with the fluid flow moving over the body from the vortex ring generator.

According to a preferred feature of the invention, the vortex ring generator is designed in accordance with the Golden Section or Phi geometry.

According to a preferred feature of the invention, the vortex ring generator is centripetal in its action According to a further aspect, the invention resides in a vortex ring generator comprising an element adapted to be associated with a body to influence the fluid flow passing over the body, the element comprising an active surface which is adapted to influence the fluid flow, the active surface having a configuration conforming to at least one logarithmic curve of the Golden Section.

According to a preferred embodiment, the vortex ring generator associated with the body and comprising one or more vanes having an active surface, the path of the vanes spiralling around and along the body.

According to a preferred embodiment, the vortex ring generator extends forwardly of the body.

According to a preferred embodiment, the vanes are in the form of a whorl.

According to a preferred feature of the invention, the active surfaces of the vanes are designed to conform to the Golden Section.

According to a preferred embodiment, the path of the vanes are designed to conform to the Golden Ratio.

According to a preferred embodiment, the vortex ring generator comprises one or more grooves associated with the body, the path of the vanes spiralling around and along the body.

According to a preferred embodiment, the path of the grooves are designed to conform to the Golden Ratio.

According to a preferred embodiment, a vortex ring is generated by the body and vortex ring generator being caused to move through the fluid.

According to a preferred embodiment, a vortex ring is generated by the fluid moving past the vortex ring generator associated with a body According to a preferred embodiment, a vortex ring generator is fixed relative to the body.

According to a preferred embodiment, a vortex ring generator is adapted to be movable relative to the body.

According to a preferred embodiment, a vortex ring is generated by movement of the vortex ring generator.

According to a preferred embodiment, a vortex ring is generated and propulsion is created by the powered rotation of the vortex ring generator.

The invention will be more fully understood in the light of the following description of several specific embodiments.

BRIEF DESCRIPTION OF THE DRAWINGS

The description is made with reference to the accompanying drawings, of which:

FIG. 10 is a diagrammatic representation of the flow of vortex rings around a body having vortex ring generator according to the first and third embodiments;

FIG. 11 is a diagrammatic representation of the flow of vortex rings around a body having vortex ring generator according to the second embodiment;

FIG. 12 is a diagrammatic representation of the generation of a vortex ring around by vortex ring generator according to the first embodiment.

DETAILED DESCRIPTION

Each of the embodiments comprises a vortex ring generator associated with a body and adapted to generate a vortex ring in the fluid moving relative to the body. In each embodiment, the vortex ring generator comprises a fluid pathway having an active surface adapted to influence the flow of the fluid to form the vortex rings flowing past the body.

As stated previously all fluids when moving under the influence of the natural forces of Nature, tend to move in spirals or vortices. These spirals or vortices generally comply with a mathematical progression known as the Golden Ratio or a Fibonacci like Progression.

Figure 1:
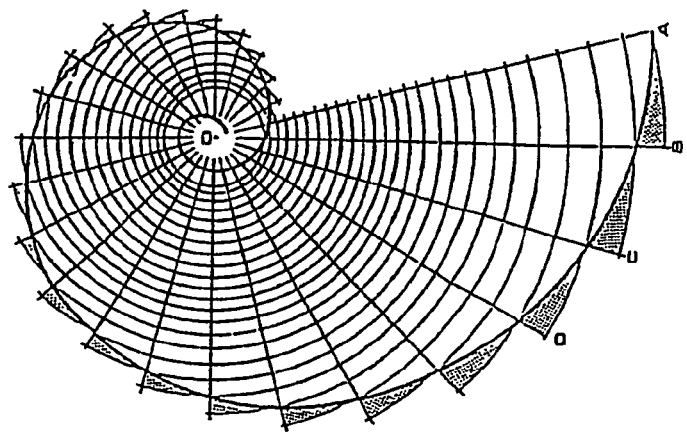
FIG. 1 illustrates the form of the Golden Section.
Figure 1:
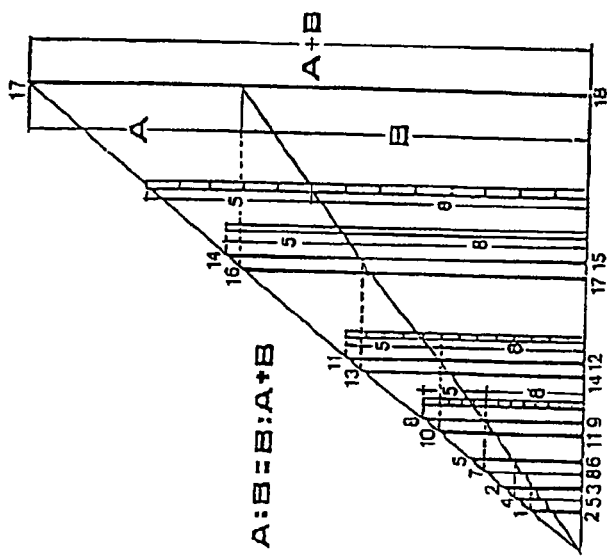
Figure 1:
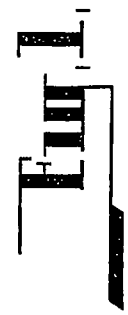
Figure 1:
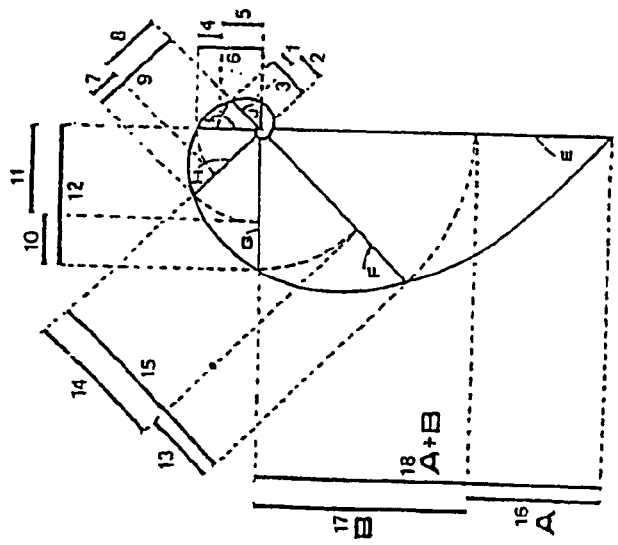
Figure 2:
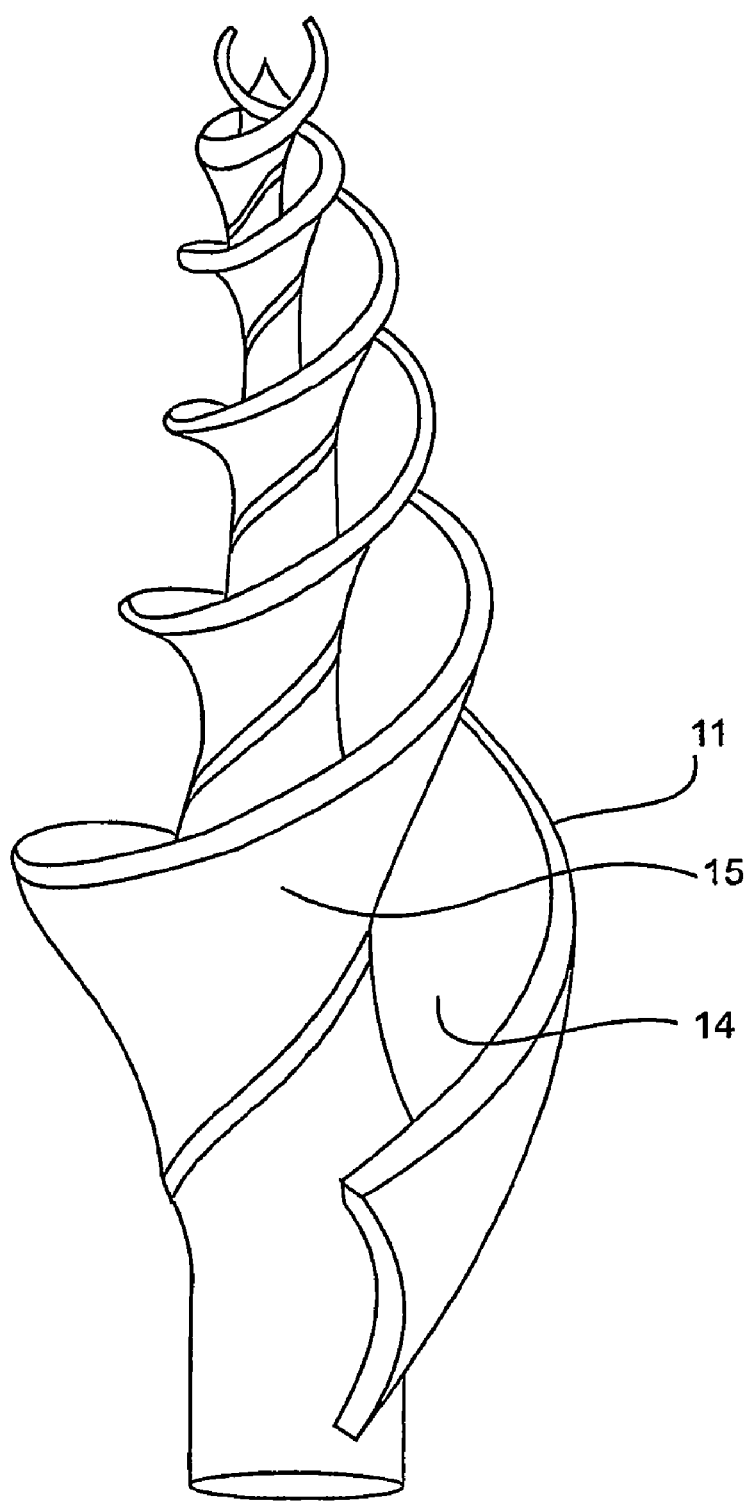
FIG. 2 is a side elevation of a vortex ring generator according to the first embodiment.
Figure 3:
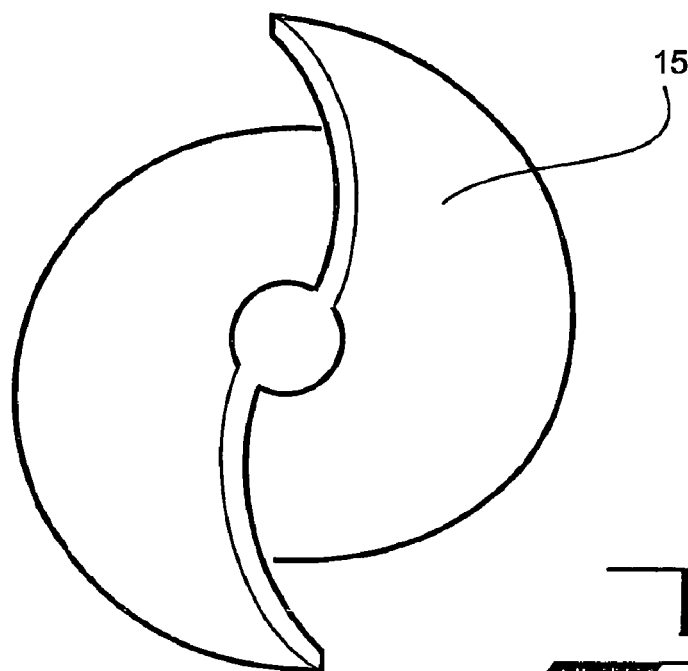
FIG. 3 is a front end view of a vortex ring generator according to the first embodiment.
Figure 4:
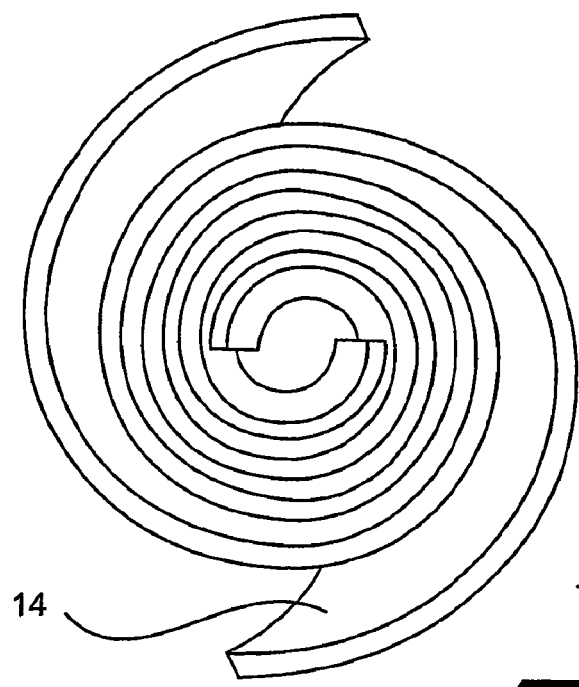
FIG. 4 is a rear end view of a vortex ring generator according to the first embodiment.
Figure 5:
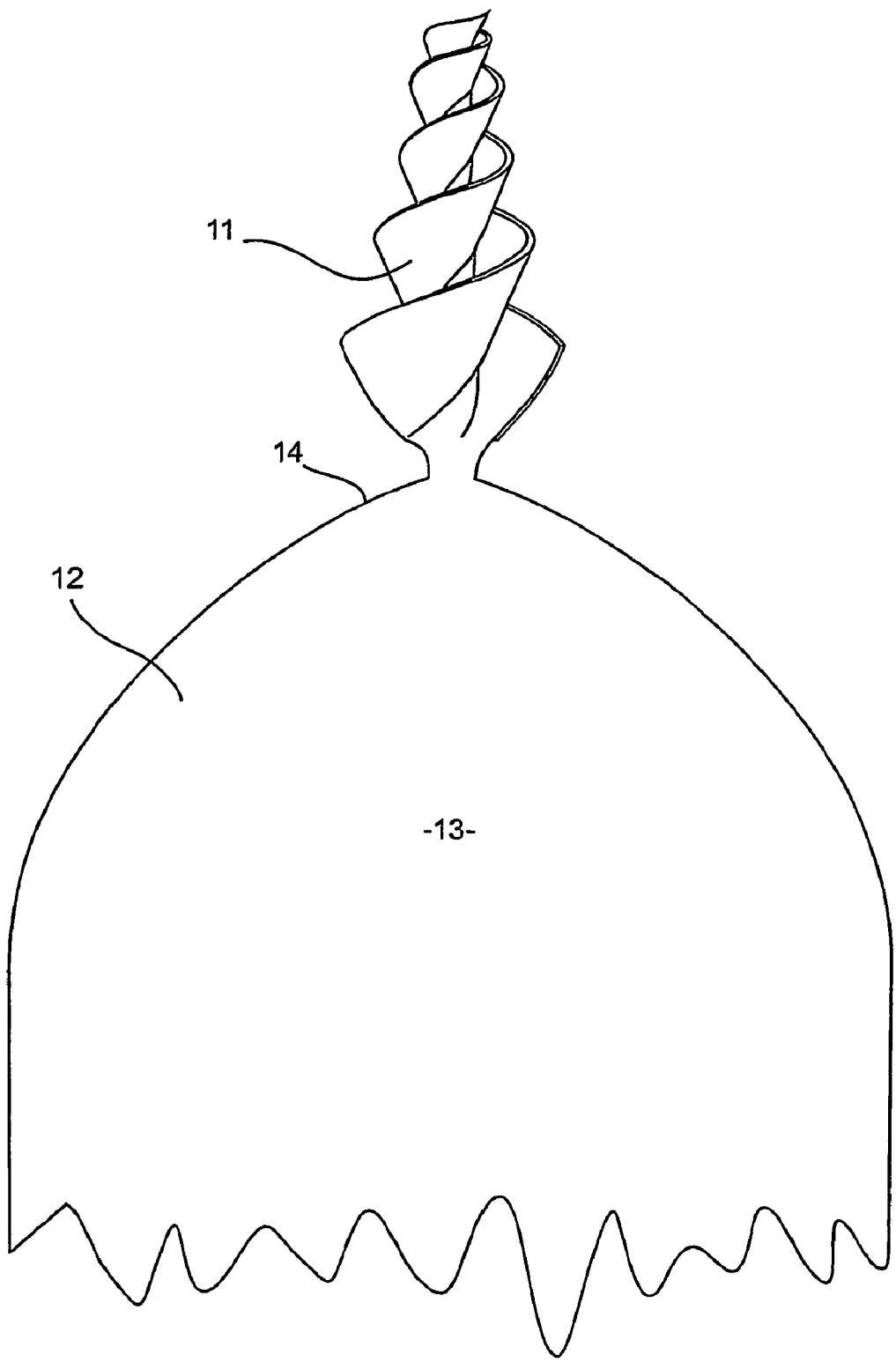
FIG. 5 is a side elevation of a vortex ring generator mounted to a body according to the first embodiment.

The greater percentage of the surfaces of the active surfaces of each of the embodiments described herein are generally designed in the greater part, in accordance with the Golden Section or Ratio and therefore it is a characteristic of each of the embodiments that the active surfaces are of a spiralling configuration and which conform at least in greater part to the characteristics of the Golden Section or Ratio. The characteristics of the Golden Section are illustrated in FIG. 1 which illustrates the unfolding of the spiral curve according to the Golden Section or Ratio. As the spiral unfolds the order of growth of the radius of the curve which is measured at equiangular radii (eg E, F, G, H, I and J) is constant. This can be illustrated from the triangular representation of each radius between each sequence which corresponds to the formula of a:b=b:a+b which conforms to the ratio of 1:0.618 approximately and which is consistent through out the curve.

A characteristic of the embodiments is that not only do the X and Y axis conform to Golden Section geometry, but also the Z axis or depth conforms, that is the vanes conform to the Golden Section in three dimensions.

It is an objective of the embodiments to duplicate the lines of vorticity found in a ring vortex. To that end, the active surfaces expand or contract logarithmically in any direction in an equiangular, Golden Section spiral. If any two points are taken on the surface of these active surfaces they will bear a ratio to each other of approximately 1:0.618. The active surfaces can be any length or number of rotations. They are specifically designed to match the internal, streamlined flow lines of vorticity of a vortex.

In the first embodiment, and as shown in FIGS. 2 to 5, the vortex ring generator (11) comprises a set of vanes located at the nose (13) of a body (12). In this specification, the term nose is used to identify the portion of the body which is intended to face the direction from which the relative flow of fluid is approaching the body.

The vortex ring generator (11) is adapted to generate a vortex ring by influencing the flow of the fluid relative to the body in a way which produces a vortex ring. The vanes comprising the vortex ring generator extend forwardly from the nose of the body and have the configuration of a whorl. Each of the vanes are formed with an internal reactive face (14) which is of a concave configuration and which has a three dimensional curvature of a concave nature whereby the curvature in each direction is in accordance with a logarithmic curve conforming to the Golden Section. As a result, the vanes (11) jointly define a generally concave internal face of the vortex ring generator.

In addition, each vane has a remote reactive face (15) which is remote from the internal reactive face (14) and which also has a three dimensional curvature of a convex nature whereby the curvature in each dimension conforms with a logarithmic curve according to the Golden Section, and whereby the curvature in each dimension is of the same form as the curvature of the internal reactive face (14) in each dimension. As a result, the remote reactive faces (15) jointly define a generally convex surface of the vanes.

In an adaptation of the first embodiment, the vortex ring generator is not fixedly mounted to the nose but rather is adapted to rotate coaxially with the axis of the body. In addition, the generator may be driven mechanically to rotate thereby providing propulsion to the body whilst simultaneously generating vortex rings.

Figure 6:
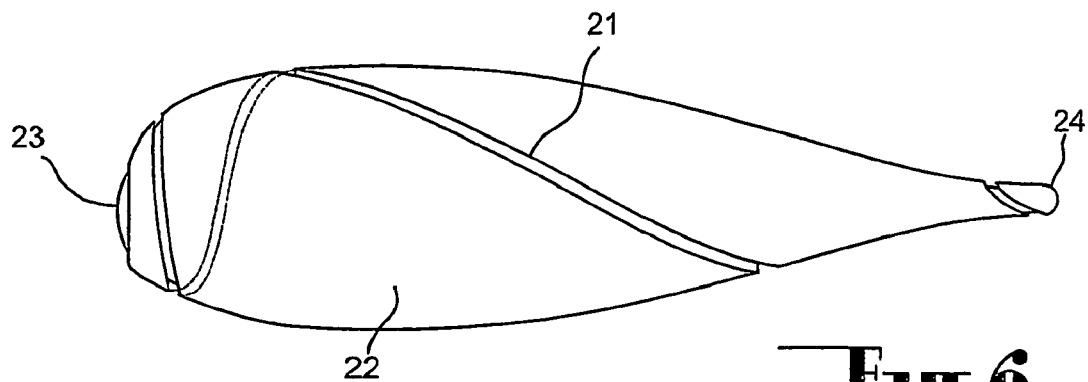
FIG. 6 is a side elevation of a vortex ring generator applied to a body according to the second embodiment.
Figure 7:
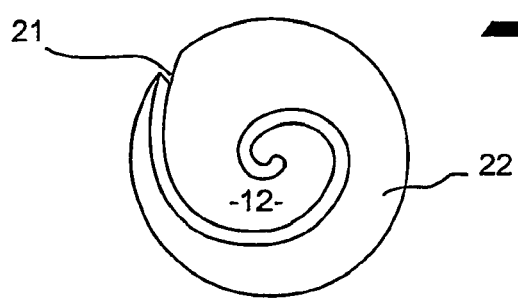
FIG. 7 is a front end view of a vortex ring generator applied to a body according to the second embodiment.

In the second embodiment, as shown in FIGS. 6 and 7, the vortex ring generator comprises a set one or more grooves or flutes (21) in the surface of the body, commencing at or near the nose (23) of the body (22) and ending at or near the tail (24) of the body. The paths of the grooves or flutes along the body spiral around the body in a manner designed to conform to the Golden Ratio.

Figure 8:
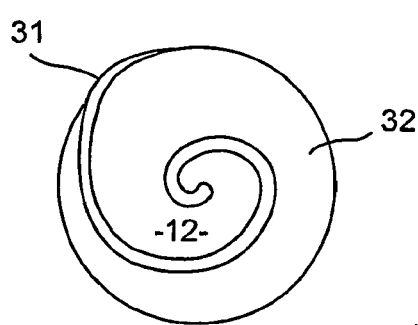
FIG. 8 is a side elevation of a vortex ring generator applied to a body according to a third embodiment.
Figure 9:
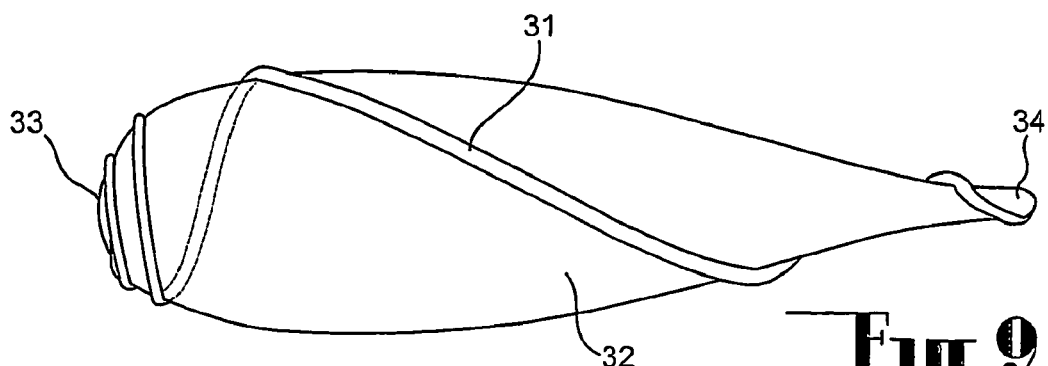
FIG. 9 is a front end view of a vortex ring generator applied to a body according to the third embodiment.

In the third embodiment, as shown in FIGS. 8 and 9, the vortex ring generator comprises a set one or more vanes (31) extending outwardly from the surface of the body, commencing at or near the nose (33) of the body (32) and ending at or near the tail (34) of the body. The paths of the vanes along the body spiral around the body in a manner designed to conform to the Golden Ratio.

The body in each of the above embodiments is ideally designed in accordance with a logarithmic, equiangular, Phi spiral. Its shape is optimally compatible with Phi vortex geometry, which is common to all vortices. In other words the body occupies that space which is seen in the cavitation tube of a visible vortex.

As depicted in FIG. 11, the body, 13, is accommodated within the core of the vortex, 16. The nose of the body, by use of embodiment one, two or three above exactly fits the geometry of a ring vortex. The body may be cone-shaped with a hollow centre allowing fluid incoming to the vortex ring to travel through its core.

FIGS. 10, and 11 illustrate the creation of ring vortices, 16, which travel/roll along the body.

In operation, with relative movement between the fluid and the body, the fluid is engaged by the active surfaces 11, 21 or 31 and commences rotating in a logarithmic vortical fashion. As the fluid engages the active surfaces, the rotary motion creates a low-pressure area at the base of the vortex generator (the interface between the generator and the nose of the body). This reduces the boundary layer drag of the body. A ring and/or potential vortex is established. As can be seen in FIG. 10, the ring vortex rolls up the boundary layer like ball bearings, along the body walls. In many applications vortex rings will shed and give rise to a stream of shed vortex rings. The wake left behind the body is in the shape of vortex rings.

FIG. 12 illustrates the vortex ring generator, 11 of the first embodiment creating a ring vortex, 16. To do so, there must be relative motion between the vortex ring generator, 11, and the fluid.

This motion can be created by rotation of the vortex ring generator; the movement of fluid past a stationary vortex ring generator, or the propulsion of the body and vortex ring generator through the fluid.

It should be appreciated that the scope of the present invention need not be limited to the particular scope described above.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A vortex ring generating system, comprising:
a fixed, stationary body subjected to fluid flow; and
a spiraled surface permanently affixed to the fixed, stationary body whereby the spiraled surface does not rotate independent of the fixed, stationary body, the spiraled surface conforming substantially to a logarithmic spiral, wherein the radius of the logarithmic spiral measured at equiangular radii unfolds at a constant order of growth, the spiraled surface commencing proximate the forward portion of the fixed, stationary body and terminating proximate the rear portion of the fixed, stationary body, the surface configured to induce the formation of a vortex ring surrounding the fixed, stationary body as a fluid flows from the forward portion of the fixed, stationary body toward the rear portion of the fixed, stationary body.

2. The vortex ring generating system of claim 1, wherein the spiraled surface includes one or more vanes, wherein at least a portion of each of the one or more vanes are incident to the fluid flow.

3. The vortex ring generating system of claim 2, wherein the one or more vanes are configured in the form of a whorl.

4. The vortex ring generating system of claim 2, wherein the one or more vanes each include a surface area conforming substantially to a logarithmic spiral, wherein the radius of the logarithmic spiral measured at equiangular radii unfolds at a constant order of growth.

5. The vortex ring generating system of claim 2, wherein the one or more vanes are configured in a path that spirals around and along the fixed, stationary body.

6. The vortex ring generating system of claim 5, wherein the path of the vanes that spirals around and along the fixed, stationary body conforms substantially to a logarithmic spiral, wherein the radius of the logarithmic spiral measured at equiangular radii unfolds at a constant order of growth.

7. The vortex ring generating system of claim 1, wherein the spiraled surface extends without interruption from the forward portion of the fixed, stationary body to the rear portion of the fixed, stationary body.

8. A vortex ring generator comprising:
a fixed, stationary body including a nose and a tail; and
a vane extending outwardly from the fixed, stationary body, the vane commencing near the nose of the fixed, stationary body and ending near the tail of the fixed, stationary body, the vane defining a spiral path around the fixed, stationary body, the vane configured to induce the formation of a vortex ring with respect to the flow of fluid incident the vane, a surface area of the vane conforming substantially to a logarithmic spiral, wherein the radius of the logarithmic spiral measured at equiangular radii unfolds at a constant order of growth from the nose to the tail, wherein the vane is permanently affixed to the fixed, stationary body such that the vane does not rotate independent of the fixed, stationary body.

9. The vortex ring generator of claim 8, wherein the spiral path of the vane conforms substantially to a logarithmic spiral, wherein the radius of the logarithmic spiral measured at equiangular radii unfolds at a constant order of growth.

10. The vortex ring generator of claim 8, wherein the fixed, stationary body is conical in shape with a hollow centre.

11. The vortex ring generator of claim 8, wherein the surface area of the vane includes an internal reactive face having a three dimensional curvature, the curvature conforming to a logarithmic curve in at least two directions.

12. A body configured to reduce drag in a flowing fluid, the body comprising:
an axis aligned with a direction of fluid flow relative to the body, and wherein the body is fixed and stationary with respect to the flowing fluid; and
a vortex ring generator permanently coupled to the body such that the vortex ring generator does not rotate independent of the body, the vortex ring generator including a helical vane disposed around a central axis aligned with the axis of the body and extending from the nose of the body to the rear of the body, the helical vane conforming to a logarithmic spiral, wherein the radius of the logarithmic spiral measured at equiangular radii unfolds at a constant order of growth, the vortex ring generator configured to induce the fluid to form vortex rings around the body whereby the drag of the fluid against the body is reduced.

13. The body of claim 12, wherein the vortex ring generator further projects outward from the nose of the body.

14. The body of claim 12, wherein the vane is disposed around the body and extends outwardly from a surface of the body.

* * * * *